March 23, 1937.  A. E. RAMCLOW  2,074,706

VALVE ASSEMBLY

Filed March 13, 1936

Inventor
Axel E. Ramclow
By V. F. Lampue
Atty.

Patented Mar. 23, 1937

2,074,706

UNITED STATES PATENT OFFICE 2,074,706

VALVE ASSEMBLY

Axel E. Ramclow, Chicago, Ill., assignor to International Harvester Company, a corporation of New Jersey Application March 13, 1936, Serial No. 68,592

2 Claims. (Cl. 137—68)

This invention relates to a float controlled valve assembly. More specifically, it relates to a float operated valve construction particularly adapted for use where leakage must be a minimum and where the valve must be accessible for replacement.

The household refrigerators now in wide use operate with an evaporator in which a reserve supply of liquid refrigerant is accumulated whereby the compressor mechanism may be operated only at predetermined intervals. Many of these constructions utilize, what is known as, a high side float. In constructions of this type, a float chamber is used on the high pressure side of the compressor system. This necessitates an accurate, close-fitting valve and also requires a construction in which the valve can be readily removed and replaced, if it should develop leakage. It is to provide particularly for uses of this type that the construction of the present invention has been devised.

For uses as above pointed out, the particular object of the improved float controlled valve of this invention is to provide a float and valve construction which can be hermetically sealed in all of its principal parts and which is provided with a simplified valve arrangement by which the valve may be removed and replaced without dismantling the principal component parts of the float valve and the associated parts.

Other objects, such as the removable yet positive connection between a valve and a float, will be apparent from the detailed description to follow. In the drawing:
Figure 1 is a side elevation of a float chamber broken away to show the float and the mechanism for controlling the admission valve to the float chamber;

Figures 1, 2:
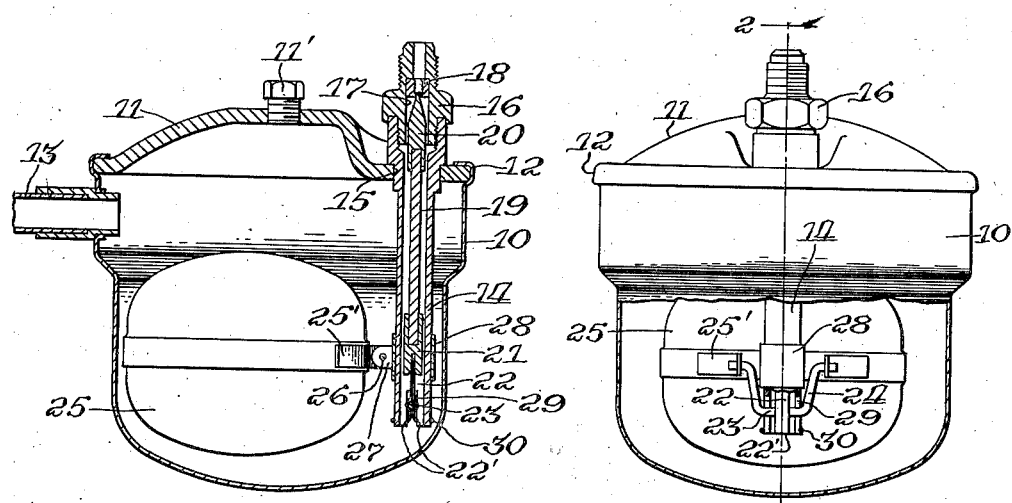
Figure 2 is a section taken on the line 2—2 of Figure 1.
Figure 3:
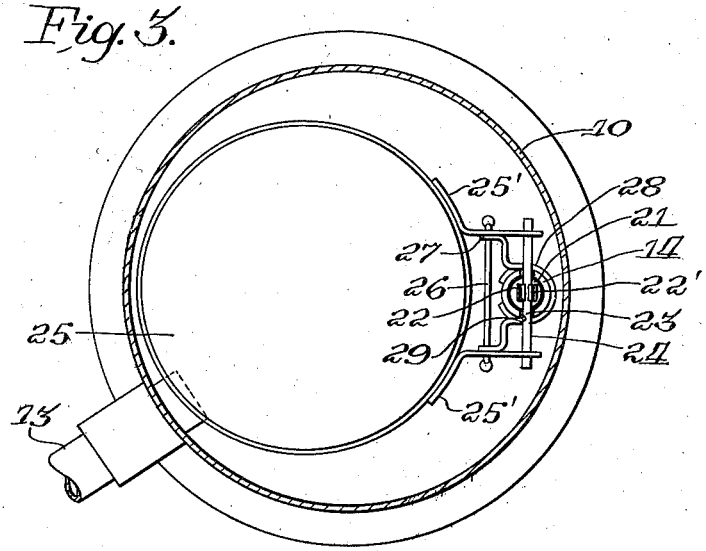
Figure 3 is a bottom plan view of the construction shown in Figure 1 with the bottom of the float chamber broken away in section to show the float and its valve controlled mechanism; and,
Figure 4:
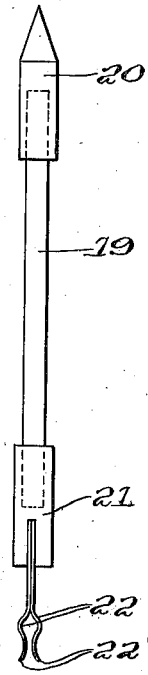
Figure 4 is an enlarged elevation of the valve assembly.

The float chamber, as illustrated, is made up of a cup 10 and a cover 11. The upper edge of the cup is secured to the cover by a permanently rolled edge portion 12. The connection after rolling is soldered or brazed to make a permanently tight seal against the escape of gases. A removable plug 11' is shown in the cover which may be used for inspection of the float chamber. An inlet conduit 13 for connection to the condenser of a refrigeration system is connected to the top of the cup 10. A cylindrical valve housing 14 is fitted into an opening 15 formed in the cover 11 and is permanently secured thereto in a gas tight manner by soldering, or brazing. This connection is preferably made before the cover 11 is attached to the cup 10 so that both sides of the cover may be sealed with respect to the housing.

The valve housing 14 is internally threaded at the top to receive a threaded fitting 16. Said fitting is adapted to be connected to the source of fluid supply. Internally the fitting 16 is provided with a bore 17 extending upwardly from the lower end into which a valve seat member 18 is fitted. Said member is fitted in a fluid-tight relation with respect to the bore 17. A small center orifice is formed in the valve seat member for the controlled flow of fluid.

A valve assembly 19 is fitted into the housing 14. Said assembly includes a valve stem on the upper end of which a needle valve 20 is permanently secured. Said valve is formed to seat in the orifice of the valve seat member 18. The lower end of the valve assembly 19 is provided with a guide member 21 fitted with respect to the housing to provide for fluid flow downwardly through the housing. The guide member 21 is formed at the lower end with a slot in which contacting spring members 22 are fitted. Said members are shaped at their lower ends with mating semi-cylindrical portions adapted to embrace a cylindrical bearing portion 23 of a valve operating member 24. The lower ends of the spring members 22 are bent outwardly as indicated by the numeral 22' whereby the valve assembly may be engaged with the bearing portion 23 by downward pressure which results in snapping the spring members over the bearing portion. A positive connection is then formed for moving the valve assembly in either vertical direction.

A conventional float 25 mounted in the cup 10 is provided with spaced hinging and valve operating elements 25'. Said elements form means for hinging the float on a transverse pivot pin 26 which extends through the spaced ears 27 of a bracket 28 secured to the valve housing 14. By this means the float 25 is hinged for movement on a horizontal axis with respect to the valve housing 14. The elements 25 are formed with aligned openings beyond the pivot pin 26 in which the valve operating member 24, previously described, is pivotally supported. Said member is substantially U-shaped, as best shown in Figure 1, with the upper ends bent into horizontal alignment for pivoting in the openings formed in the elements 25.

Vertically ending diametrically opposed slots 29 are formed in the lower end of the valve housing 14. The horizontal bearing portion 23 of the valve actuating member 24 extends through said slots and is vertically movable therein, as the float 25 moves about its pivot pin 26. To maintain the member 24 in the slots, a spring clip 30 is mounted in an annular recess milled around the bottom of the valve housing 14. This link also serves as a stop to hold the member 24 in position when the removable valve assembly is being pushed into operative position.

The operation of the valve and float assembly will be understood from the detailed description given above. During normal operation liquid from the condenser is supplied through the conduit 13 whereby the float 25 rises. When liquid in the float chamber reaches a predetermined level, the needle valve 20 is opened for the discharge of liquid from the float chamber. When the liquid level in the float chamber reaches a predetermined low level, the needle valve 20 closes the orifice in the member 18 to prevent the discharge of liquid until a supply has again been built up in the float chamber.

When either for inspection or for replacement, it is necessary to remove the needle valve 20, the fitting 16 is unscrewed and the entire valve assembly 19 is withdrawn from the housing 14. During such movement, the spring members 22 are unsnapped from the bearing portion 23 of the valve actuating member. The valve assembly is replaced in the same manner with the spring members being snapped over the actuating member 24. It is to be understood that applicant has shown and described only a preferred embodiment of his improved float controlled valve assembly and that he claims as his invention all the modifications falling within the scope of his appended claims.

What is claimed is:

1. In a float controlled valve assembly including a float chamber and in combination therewith a cylindrical valve housing extending from the top of the float chamber vertically into the chamber and terminated above the bottom thereof, a float hinged to said housing near the lower end thereof, valve actuating elements carried by the float and extending adjacent the housing, a valve actuating member pivoted to said elements on a horizontal axis, said member having a depending U-shaped center portion, a valve assembly mounted for vertical movement in said housing, spring members carried by the lower end of said assembly, said members being disengageably connected to the center portion of the valve actuating member, a removable fitting secured to the top of the valve housing, a valve seat provided in said fitting and a needle valve carried by the valve assembly at the upper end and positioned to cooperate with said valve seat.

2. In a float controlled valve assembly including a float chamber and in combination therewith a cylindrical valve housing extending from the top of the float chamber vertically into the chamber and terminated above the bottom thereof, a float hinged to said housing near the lower end thereof, a valve actuating member carried by the float, diametrically opposite vertical slots extending into the valve housing from the lower end, said actuating member having a horizontal portion vertically slidable in said slots, a valve assembly mounted for vertical movement in said housing, spring members carried by the lower end of said assembly, said members being disengageably connected to the horizontal portion of the valve actuating member, a removable fitting secured to the top of the valve housing, a valve seat provided in said fitting and a needle valve carried by the valve assembly at the upper end and positioned to cooperate with said valve seat.

AXEL E. RAMCLOW.